United States Patent [19]

Smither et al.

[11] 4,320,473
[45] Mar. 16, 1982

[54] BOREHOLE ACOUSTIC TELEMETRY CLOCK SYNCHRONIZATION SYSTEM

[75] Inventors: Miles A. Smither; Octavio A. Vela, both of Houston, Tex.

[73] Assignee: Sperry Sun, Inc., Sugar Land, Tex.

[21] Appl. No.: 65,474

[22] Filed: Aug. 10, 1979

[51] Int. Cl.$^3$ ............................................... G01V 1/40
[52] U.S. Cl. ..................................... 367/82; 367/77; 375/119; 375/3
[58] Field of Search ............... 367/77, 82, 83; 375/3, 375/4, 23, 81, 118–120, 112; 370/29, 32, 43, 84; 455/13

[56] References Cited

U.S. PATENT DOCUMENTS

| | | | |
|---|---|---|---|
| 3,205,477 | 9/1965 | Kalbfell | 367/82 |
| 3,293,607 | 12/1966 | Kalbfell | 367/82 |
| 3,585,298 | 6/1971 | Liberman | 375/119 |
| 3,619,662 | 11/1971 | Vachon | 375/119 |
| 3,889,228 | 6/1975 | Shawhan | 367/82 |
| 3,962,635 | 6/1976 | Raza | 375/4 |
| 3,992,581 | 11/1976 | Davis | 375/3 |
| 4,001,775 | 1/1977 | Sexton et al. | 367/83 |
| 4,073,341 | 2/1978 | Parker | 367/82 |
| 4,156,229 | 5/1979 | Shawhan | 367/82 |
| 4,166,979 | 9/1979 | Waggener | 367/83 |

*Primary Examiner*—Nelson Moskowitz
*Attorney, Agent, or Firm*—Thomas L. Crisman; Stanley R. Moore

[57] ABSTRACT

In a borehole telemetry system for acoustically transmitting data over a pipe suspended in a borehole, the level of noise in the data stream is inherently high, making the use of discrete frequencies advantageous to provide useful data. Any drift in electrical circuits which might affect or be affected by the use of precise frequencies is undesirable. A clock synchronization or bit rate clock circuit in a data signal processing system is operated by a local crystal oscillator which is operated at substantially the same precise frequency as a crystal oscillator that is used to generate and transmit the data signal. The synchronization of the bit rate clock is arranged to make only small corrections in order to keep the frequencies fully synchronized at all times thus false signals will not shift the clocks out of synchronization. The bit rate clock has an early late detector that determines if received data is expected early or late with respect to the data clock that is transmitting the data and shifts a window in the circuit accordingly. Another feature includes a fast search mode that causes the clock systems of the transmitted data signal and the clock system in the data signal processing circuit to move rapidly into synchronization when the signals are far out of synchronization, bypassing arrangements in the circuit that make only small corrections. The output of the bit rate clock operates a transmitter section to transmit the data signal at any desired frequency but at the same bit rate.

16 Claims, 6 Drawing Figures

BOREHOLE ACOUSTIC TELEMETRY CLOCK SYNCHRONIZATION SYSTEM

BACKGROUND OF THE INVENTION

This invention relates to acoustic telemetry in a borehole and more particularly to acoustically transmitting data over a pipe suspended in a borehole using precise frequencies of transmission. The problem of borehole telemetry has prevailed in the petroleum industry for a number of years. This problem has become increasingly crucial with the advent of deeper drilling, increased activity offshore, and rapidly escalating costs of drilling, all of which have brought about the requirements for drilling safer and less expensively. The acquisition of real time data from the bottom of a well-bore and in particular data associated with the parametric conditions of a drill bit offers the greatest potential for utilizing such a system. Recent increased attention to our energy needs has brought about the need for deeper drilling as well as increased activity in higher cost offshore and hostile environments. Basic drilling costs have escalated 150% in the last decade. These energy needs and escalating costs have focused attention on all potential methods to drill safer and cheaper. Of the possible methods, real time data from the drill bit offers the greatest potential to improved drilling efficiency and effectiveness in both exploration and production wells. The search for a reliable and economical method of obtaining information from the vicinity of the bit while drilling has been a goal ever since the advent of rotary drilling. Except in very special circumstances, however, previous attempts to develop real time measure-while-drilling (MWD) systems have not met with success. Current technology is limited to surface evidence of drilling effectiveness. For example, measurements are presently made during drilling which include rotation rate, penetration rate, torque, etc. Also measured at the surface are the properties of the drilling fluid, i.e., weight, viscosity, etc. Systems are available to take the surface measurements and convert the information from analog to digital form, then process and display the parameters along with information inferred from them. Where experience is sufficient, these measurements may be used successfully in predicting problems such as abnormal formation pressure before a well control problem occurs. Lithology can also be inferred from certain types of measurements. However, the limitation remains that only surface information is available to infer conditions which may be far beneath the earth's surface.

Directional surveys of a borehole can be made presently by means of pump down or wireline tools. Here again, this is an after the fact measurement which requires significant interruption of the drilling process. Presently in commercial use are mud pulse systems for telemetering data from the bit vicinity to the surface, however, these systems are limited in their capability and application and as yet require the cessation of drilling.

There are basically four types of systems which show promise as communication and transmission techniques in a borehole telemetry system. These are mud pressure pulses, electromagnetic methods, insulated conductor or hardwire systems, and acoustic methods. Each of these systems has its advantages and disadvantages. The present application is concerned with an acoustical technique for transmitting signals through the drill pipe.

This system offers a high degree of reliability together with a rapid data rate, and the potential of low development and production costs. The greatest obstacle to the development of such a system has been the very low intensity of the signal which can be generated downhole, along with the acoustic noise generated by the drilling system resulting in a high ratio of noise to signal. In order to overcome these problems work has proceeded in the development of a system utilizing repeaters in the drill pipe string to help alleviate the signal attenuation problem. As the development of this system proceeds, it is apparent that the use of discrete frequencies falling into particular band widths is essential for the successful transmission of acoustic data on a drill pipe. Accordingly, every means possible must be utilized in order to increase the efficiency of such a system to realize successful data transmission. One of the problems encountered in working with discrete frequencies is that of drift in the system which effects the synchronous use of precise frequencies. For example, temperature stability of components is a major problem together with the high cost of more stable components. This is aggravated by the severe temperature range which is encountered in drilling a well far beneath the earth's surface. In addition, the deterioration of components causes changes in circuit operations which in a precision system present problems. Another factor to be considered is that of the replacement of system components and the affect that such replacement would have on the alignment of the system in view of the precision required in the systems.

It is therefore an object of the present invention to provide a new and improved acoustic telemetry system having stable circuit systems to permit the use of precise frequencies.

SUMMARY OF THE INVENTION

With this and other objects in view, the present invention contemplates an acoustic telemetry system for use in a borehole environment and utilizing digital implementation of a clock synchronization system in a data signal processing circuit which includes a local crystal oscillator operating at substantially the same precise frequency as that of a crystal oscillator used to operate the transmitter that generates the data signal being detected by the data signal processing circuit.

An early late detector in the system compares the received data bit with a clock signal and shifts a window in the system in response to whether the data bit is received early or late compared to the clock. The early late detector is arranged to shift the window only very small increments since the clocks generating the data bit and signal processing system are normally operating in very close synchronization. A fast search mode in the system operates in response to the absence of data bits for a predetermined period of time to shift the window rapidly until the clocks are in synchronization and a data bit is received.

The output of the clock synchronization system is used to operate a retransmit section which retransmits the data signal.

DETAILED DESCRIPTION OF THE DRAWINGS

DESCRIPTION OF THE PREFERRED EMBODIMENTS

Figure 1:
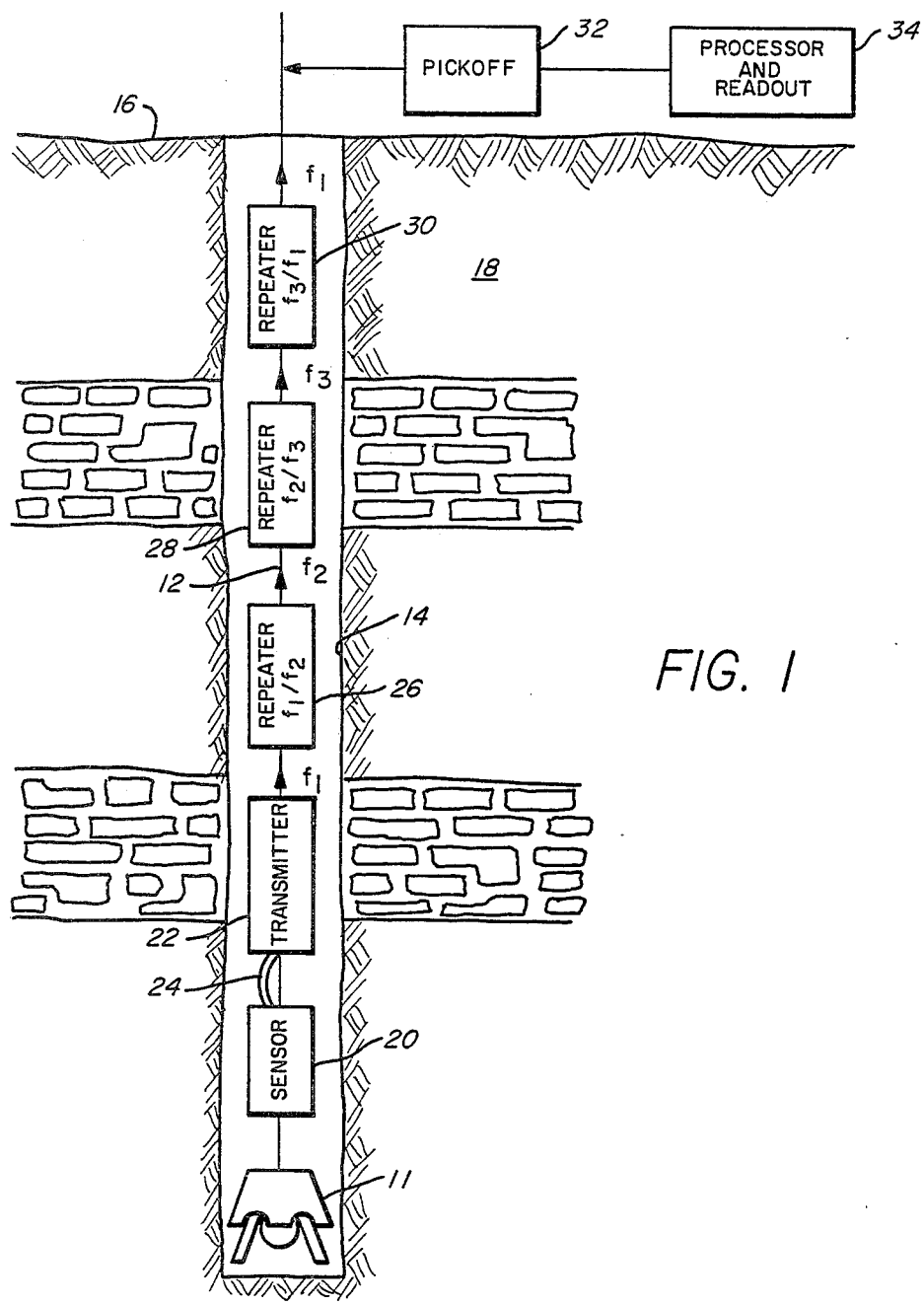
FIG. 1 is a schematic diagram of an acoustical telemetry system for use in boreholes.

The invention may be embodied in a borehole telemetry system as illustrated in FIG. 1. As schematically shown, the telemetry system is incorporated into a conventional drilling apparatus that includes a drill bit 11 in a drill stem 12 which are used to drill a borehole 14 from the surface 16 through earth formations 18. Information concerning parameters in a borehole is often desirable during drilling to plan further progression of the hole. This can be secured by a sensor 20 or similar device, in the drill string. Sensor 20 can, for example, be an orientation sensing device that provides information necessary for directional drilling. This type device would normally be placed in the drill string very near the drill bit 11.

Information generated by the sensor 20 is usually sent to the surface 16 where it can be evaluated and utilized. One transmission system useful for such purposes is an acoustic telemetry system that uses the drill string 12 as a transmission medium. The information is sent along the drill string 12 by an acoustical transmitter 22 which receives the information from nearby sensor 20 through an electrical conductor 24 or by other suitable means and methods of transmission.

The information is then encoded into an intelligible form that is compatible with a particular form of transmission chosen. The manner of such encoding and transmission is the subject of the present invention. Acoustical waves suffer attenuation with increasing distance from their source at a rate dependent upon the composition characteristics of the transmission medium. Many boreholes are so deep that signals sent by transmitter 22 will not reach the surface before they are attenuated to a level at which they are indistinguishable from noise present in the drill string. This problem is discussed in greater detail in co-pending application, Ser. No. 968,879.

In order that the signals reach the surface, they may have to be amplified several times. However, since acoustic waves travel in both directions along the drill string, some method is desirable that will ensure that the signals are received in only one direction. Otherwise, an amplifier would amplify signals coming from both above and below itself, rendering the system ineffective. One method that has been found suitable for producing directional isolation uses frequency shifts among three or more frequencies. Transmitter 22 starts the transmission process by transmitting the signal at a frequency $f_1$. A repeater 26 capable of receiving frequency $f_1$ is positioned in the drill string above transmitter 22. Repeater 26 retransmits the signal at frequency $f_2$ instead of frequency $f_1$.

The signal at frequency $f_2$ is sent along drill string 12 and is received by receiver 28 which is tuned to receive the signal at frequency $f_2$. Repeater 28 then transforms its signal to a frequency $f_3$ and retransmits it. The signal of frequency $f_3$ travels in both directions along the drill string 12, but it can be received only by repeater 30 which receives at $f_3$ and retransmits at $f_1$. The signal cannot be received by repeater 26 since it will receive only $f_1$. In this manner, directionality is assured using three frequencies if alternate repeaters are further apart than the distance necessary for the signal to attenuate to an undetectable level.

Figure 2:
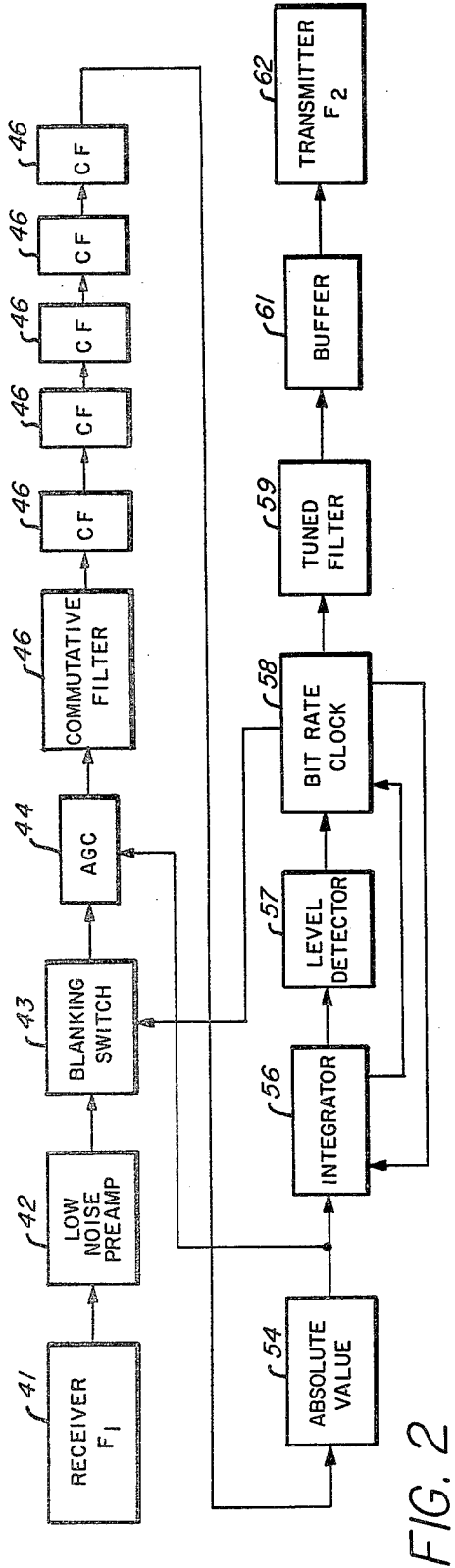
FIG. 2 is a schematic diagram of a receiving transmitting circuit for use in the present invention.

A sufficient number of repeaters to transmit the signal to the surface is used repeating the sequence established by repeaters 26, 28 and 30 until the surface is reached. In FIG. 1, only three repeaters are shown, although a larger number may be used. In the system of FIG. 1, repeater 30 performs the final transmission to the surface at $f_1$. At the surface of pickoff 32, which includes a receiver similar to that used in the repeaters, detects the signal in the drill string 12. The pickoff sends the signal to a processor and readout device 34 which decodes the signal and places it in a useable form. Simplistically each repeater comprises a detector, a transmitter, and a disable network. (This will be described in greater detail with respect to FIG. 2.) It should be recognized that while the basic component comprises a repeater, the transmitter portion may be used separately and in substantially the same configuration as the transmitter of the repeater. In addition, the detector portion may similarly be used as a pickoff. Although the repeater such as 26 which is shown in greater detail in FIG. 2 is utilized for explanatory purposes, it's operation and construction is exactly the same as that for repeaters 28 and 30 with changes only to alter the receive and transmit frequencies. Referring to repeater 26 for illustrative purposes, a detector portion receives the signal at $f_1$ and reconstructs the original wave form, compensating for losses and distortion occurring during transmission through the drill pipe. Detection can be accomplished, for example, by means of a transducer such as a magnetostrictive or electrostrictive device. The reconstructed signal then enters a transmitter portion of the repeater where it is again applied to the transducer which may be the same or of a similar type as that of the detector. In order to prevent chatter which is analogous to oscillations in an analog network, the transmitter portion is operated only during times that the detector is not passing its received signal into the repeater circuit. As will be discussed in more detail in connection with FIG. 2, operation of the transmitter portion actuates a blanking switch which prevents the receiver portion from receiving the signal while the transmitting portion is transmitting.

The operation of a telemetry system as shown schematically in FIG. 1 is basically as follows: The sensor 20 develops an analog signal which is converted to a digital coding by means of an appropriate analog to digital conversion system. An example of a sensor to detect directional orientation of a drill bit is shown in U.S. Pat. No. 3,935,642. The signal may also be generated as pulse width data, or the like, which can also be converted to digital data for transmission in the system to be described. The sensor developed signal in any event is passed into an analog to digital conversion system which converts the analog signal to a digital code utilizing "1" and "0" for information transmission. This information is further processed or coded to permit data to be passed in the form of bits represented by "1's." Such "1's" are transmitted as sound pulses into the pipe. Systems for coding sound pulses for borehole telemetry in a similar manner are set forth in U.S. Pat. No. 3,930,220 and co-pending application Ser. No. 968,879. An oscillator is then operated at a fixed frequency and passes its output into a sound source. The sound source then converts the electrical energy into acoustical energy which is imparted to the pipe 12. By use of crystal controlled oscillators, the passage of data bits between alternate receivers and transmitters may be clocked in a precise manner. The system preferably activates the sound source only when a one data bit is passed, thus minimizing the use of power to drive the sound source. Power would then be used continuously only to operate clocking mechanisms and other low power consumption devices in the instrument.

After the acoustic signal is placed on the pipe string 12, it produces a compressional wave which travels in both directions on the pipe. The repeaters 26, 28 and 30 in the pipe string are spaced to receive the acoustic signal while it is strong enough to be readily detected, thus the system of repeaters function to detect "1's" and then retransmit a signal at a different frequency when activated by the acoustic signal which is indicative of a "1". More specifically, the repeater 26 includes an acoustical transducer or receiver coupled to the pipe which picks up the signal transmitted in the pipe at some discrete frequency; for example, X Hz. The transducer then converts the acoustic signal into an electrical signal which contains the transmitted frequency and any noise on the drill pipe. This signal is then fed to a system such as shown in FIG. 2 which filters the signal, reconditions it, and retransmits it at a different frequency; for example, $X + \Delta X$ Hz to the next uphole repeater, if the signal transmission is taking place in an uphole direction. It is here noted that this system may be utilized to transmit information from the surface to a downhole portion of the apparatus in order to control downhole functions from the surface.

Additional repeater sections 28 and 30 are utilized in the system depending on depth. If the depth of drilling, age of pipe, etc. dictates a system utilizing more than one repeater section, subsequent sections may be operated at other discrete frequencies as for example, $X + \Delta X$ Hz and $X + 2\Delta X$ Hz, alternating between the various frequencies. If sufficient spacing is allowed before repeating a transmitted frequency, natural attenuation of the signal will prevent stray signals from same frequency stations from being interpreted as current data signals. In this respect, it may not be necessary to retransmit from repeater sections at a different frequency, thus a single frequency may be utilized throughout the system. In any event, distance between repeaters and specific frequencies will be determined by signal loss and receiver signal lock on capability.

The repeated signal is again placed on the pipe string by a sound source as an acoustic signal which travels on the pipe to the next adjacent repeater section and eventually to a surface acoustic transducer or pickoff 32. Hence the signal is amplified and converted from an acoustical signal into an electrical signal and the data is reconstructed to represent the detected downhole parameter.

Referring next to FIG. 2 of the drawings, a schematic diagram sets forth the components of a repeater section such as at 26, 28 and 30 of FIG. 1. The repeater includes a receiver section 41 comprised of an acoustic transducer for receiving an acoustic signal from the drill pipe and by means of the transducer converting it into an electrical signal. The received signal may be embedded in a high noise background. The transducer signal is passed to a low noise preamplifier 42 which, due to the low signal strength, is designed to provide as little circuit noise as possible. Preamp 42 has a high gain with its output being passed through a blanking switch 43 into AGC (Automatic Gain Control) circuit 44. The function of the blanking switch is to prevent the passage of signals into the circuit when a signal is being transmitted by the repeater.

Figure 5:
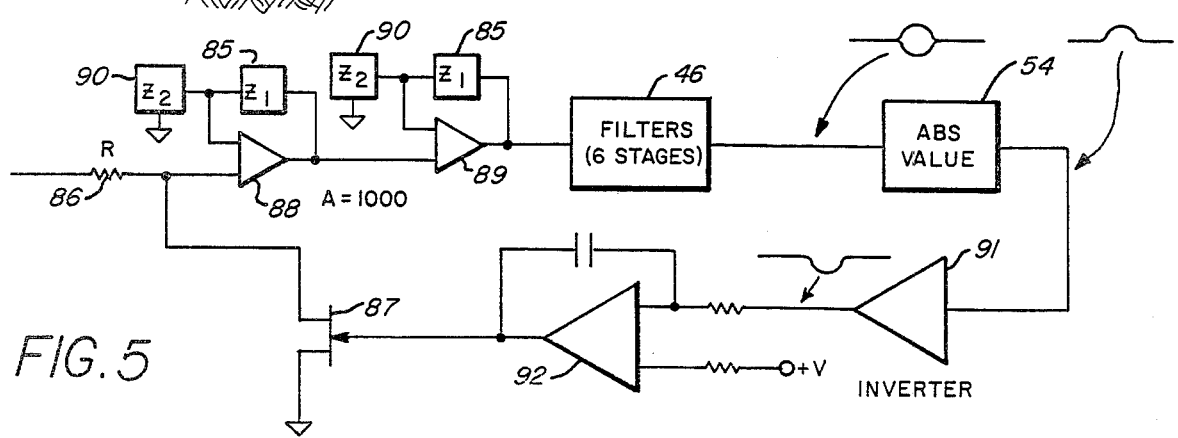
FIG. 5 is a more detailed schematic diagram of the AGC circuit of FIG. 2.

The AGC circuit 44, which will be described in greater detail with respect to FIG. 5 is arranged to pass its output signal into a commutative filter section 46 comprised of six stages of commutative filters which are designed to filter out any noise or any signal that is outside the band that is being looked for.

The output of the commutative filters 46 is passed to an absolute value network 54 which takes the eye shaped wave form output of the filters and inverts the negative portion of the signal. The absolute value circuit 54 provides an output that is the absolute value of whatever input it receives. The output of the absolute value circuit 54 is passed back to the AGC 44 to provide a feedback control to the AGC circuit that has been filtered. Such feedback loop to the AGC that comes after filtering of the noise provides a gain control to the AGC that is set by a signal having a greater signal-to-noise ratio. The absolute value circuit 54 output is also passed to an integrator circuit 56 which is arranged to integrate during the time that it expects to receive a data bit and, therefore, the output of the integrator is the integrated value of the signal that is received. Since a great deal of filtering has occurred to the signal, the noise is low at this time and, if the integrator does not see a signal, it passes an integrated value of the noise which is low. With this in mind, the output of the integrator passes to a level detector 57 which is a clip circuit that looks for a signal above a certain threshold and outputs a square wave, the width of which depends on the level of the integrator wave.

The output of the level detector 57 passes to a bit rate clock 58 which is terminology applied to a certain section of the circuitry because the primary end function of the section is to regenerate a clock which is representative of the bit rate that is present in the data stream. One function of the bit rate clock is to provide an all digital implementation for the synchronization circuitry, which is temperature insensitive as compared to an analog free running clock. An analog clock has problems with thermal stability and depends upon the initial tolerance of the components that are used to construct it. Components such as resistors and capacitors which have high thermal stability are very expensive and it therefore becomes uneconomical to provide components in the system that will develop the higher tolerances that are needed in a clock for use in a precision frequency instrument such as this. When a free running clock is used, the data stream must be used to correct a significant portion of the free running clock. In other words, a control signal must be developed from the data stream which is able to shift the frequency of the clock by a significant amount. The problem with this is that a false "1" or a noise burst in the data stream would pull the free running clock off frequency enough that it would cause the system to miss a true data bit coming in at a later time. The bit rate clock will be described in greater detail with respect to FIG. 8 of the drawings. However, it is mentioned at this time that the clock includes a local crystal oscillator which operates at substantially the same frequency as the transmitter clock that generated the data stream that is being received. Because the crystal used is a high tolerance and high stability device under changing temperature conditions, the two oscillators will be very close in frequency output and they will stay very close over a long period of time. Therefore, the synchronization circuitry of the bit rate clock only has to make small corrections by comparison to an analog clock in order to keep the two clocks fully synchronized at all times. This provides a very fine resolution of the signal and also means that a false signal or false "1" coming in the data stream will have very small likelihood of shifting the clocks out of synchronization.

An output of the bit rate clock is fed to the integrator circuit 56 to operate the integrator circuit in synchronization with the received incoming data stream. Since the bit rate clock has a local oscillator that is operated in synchronization with the transmitting oscillator, the bit rate clock knows when a received data bit should be coming in and so it operates the integrator to open a window within the system at a time when it is supposed to be receiving a data bit and then waits to see if a data bit is received or not. Assuming that there is data coming in during that time that the window is open, such data bit will have propogated through all of the filtering and through the level detector and into the bit rate clock. This refined signal then comes into the bit rate clock 58 as an output of the integrator by way of the integrator 56 going high and the level detector 57 detecting such high output of the integrator and sending it as a received "1" to the bit rate clock.

The bit rate clock then determines whether the received pulse has been received early or late, which information is passed back to the integrator 56 to shift the frequency window in response to the comparison made by the bit rate clock. The bit rate clock operates to continuously shift the window in very minute increments so that there is a continuous jittering affect going on between the bit rate clock and the integrator, with the overall affect being that the clock is fully synchronized to the clock controlling the transmitter.

Another portion of the bit rate clock 58 provides a fast search function. The purpose of the fast search is to synchronize the bit rate clock with the transmitter clock, particularly when the system is first powered, so that if the clocks are far out of synchronization it does not take a long period of time for the synchronization to be affected. The fast search mode forces the bit rate clock to search in only one direction if it does not see data for a certain period of time. This pushes the clock in one direction until the two clocks are synchronized. Then when data is being received, the bit rate clock ceases to function in the fast mode and returns to its normal mode of operation. An input to the bit rate clock 58 directly from the integrator serves to provide this fast search function of the bit rate clock with the information that a valid data signal is being received and that the fast search need not continue to operate.

The bit rate clock is comprised of CMOS circuitry (complementary metal oxide semiconductor) to provide for the low power consumption that is desirable in the operation of borehole tools. The bit rate clock outputs a square wave signal of selected frequency which may be different than that received and which is one of three different frequencies coming from three different output oscillators in the bit rate clock section. This square wave output is passed to a tuned filter 59 which converts the square wave to a sine wave which in turn is passed to a buffer amplifier 61. The buffer 61 is a power driver amplifier which increases the signal to a level sufficient to drive the transmitter 62, which is an acoustic transducer, to place the frequency acoustically upon the drill pipe for transmission to the next receiving repeater or receiver.

Another output of the bit rate clock 58 passes to the blanking switch 43 which operates to interrupt reception of the incoming signal to the remaining circuitry so that when the output of the bit rate clock operates the oscillators for driving the transmitter 62, the resulting high level signal does not saturate the circuit just described.

Figure 3:
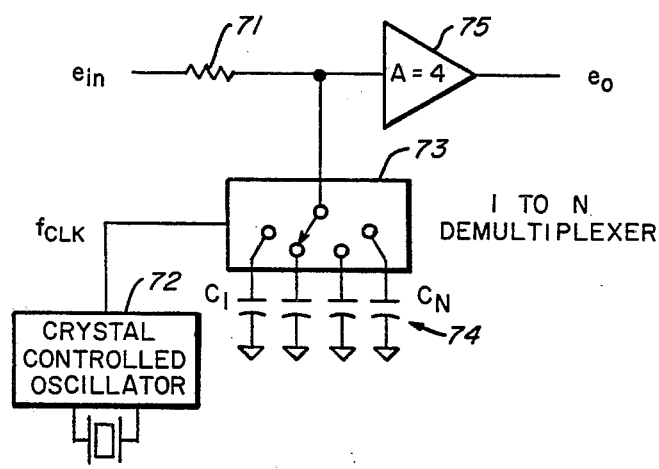
FIG. 3 is a more detailed schematic diagram of the commutative filter shown in FIG. 2.

Next referring to FIG. 3 of the drawings, a more detailed schematic representation of the commutative filters is shown. Such filters are particularly useful in the configuration described for providing the stability needed under varying temperature conditions to facilitate the precise and narrow band filtering desired in this system. An acoustic telemetry system based on amplitude shift keying requires a precise narrow band filter to discriminate between signal and noise. Conventional analog filters such as biquadratic sections can provide the required selectivity but the stability of such filters may not be adequate to meet the demands of borehole temperature extremes. The amplitude shift keyed signal is generated by a crystal controlled oscillator so that the required filter center frequency is known. The present invention makes use of this fact by controlling the center frequency of the commutative filter via a crystal controlled oscillator. The band width and selectivity are independently controlled by the RC time constant of each stage and the number of stages respectively. The commutative filter accurately and reliably establishes the center frequency of the receiver filter at the known frequency of the transmitter oscillator. This is done to within the tolerance of a crystal controlled oscillator independent of the drift (with temperature) of the passive and active components used in the filter.

Each section of the commutative filter is comprised of a 1 to n demultiplexer 73 which is clocked by a crystal controlled oscillator 72, with one oscillator being used to clock all sections of the commutative filter network. The band width and selectivity of the filter is determined by the RC time constant including the resistor 71 and the capacitor 74 of the demultiplexer. By setting resistor 71 at an optimum value we set up an RC time constant which allows the filter capacitors to charge to a useable level in as short a time as possible to give adequate averaging characteristics to the RC time constant. An amplifier 75 is provided in each stage to amplify the output signal of the filter. In the first two commutative filter sections of the system disclosed herein, the amplifiers have a gain other than unity and in the last four stages of the commutative filter section the amplifiers are unity gain amplifiers. The gains of the various sections can be other than those chosen for this particular application. As noise is progressively filtered out, the gain is increased without saturating the system with amplified noise. Thus, we can increase the gain as soon as some filtering is done so that we have a higher signal level to work with in the circuit. Then, after the first two stages of filtering, the signal level is high enough to use unity gain thereafter.

The crystal controlled oscillator 72 drives the 1 to n demultiplexer commutator through the capacitor contacts from "1" to "n" during each frequency cycle.

Figure 4:
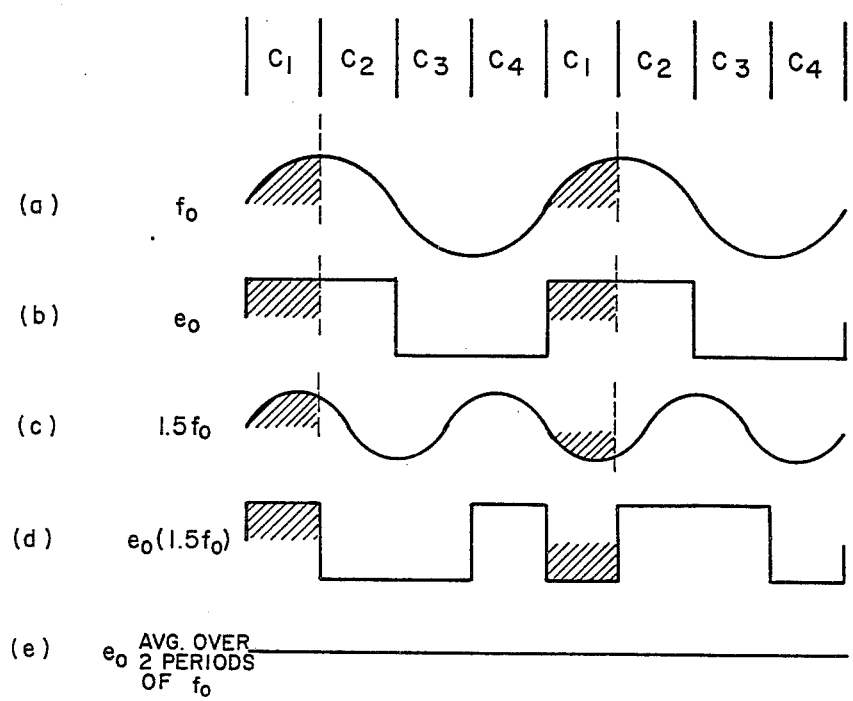
FIG. 4 is a diagrammatic representation of output voltages from the commutative filter of FIG. 3 for selected frequencies.

This is graphically demonstrated in FIG. 4 showing the $e_0$ output of the filter for a received frequency of $f_0$, which is the filter response frequency and the frequency of the crystal controlled oscillator. The dc value of each step is determined by the average value of the input wave form during the time that the commutator contacts each capacitor. The four capacitors in each of the six commutative filter sections are switched in sequence at frequency $f_0$. For a received frequency of $f_0$ with the indicated phase relation for example (line "a"), capacitor $c_1$ will charge to the average value of the up going portion of the positive half cycle and capacitor $c_2$ will charge to the average value of the down going portion of the positive half cycle. Similarly, capacitor 3 will charge to the average value of the down going portion of the negative half cycle and capacitor 4 will charge to the average value of the upgoing portion of the negative half cycle. Line b of FIG. 4 illustrates the output voltage corresponding to that portion of the cycle relating to the filter response frequency. When $f_0$ is received, $e_0$ will be the stepped output voltage shown in line b. Thus, signal or noise at frequency $f_0$ passes through the six filter stages with little attenuation and no phase shift.

When the received frequency varies from the filter response frequency $f_0$, the capacitors will charge to an average value of zero. This is demonstrated in lines c and d of FIG. 4 where it is shown that, for a frequency of 1.5 $f_0$, capacitors $c_1$ and $c_2$ will charge to an average value of zero in two cycles of the basic frequency and likewise for capacitors $c_3$ and $c_4$. For example, observing the shaded areas under the curves in FIG. 4, it is seen that $e_0$ (line "b") for $f_0$ (line "a") provides an average output for capacitor $c_1$ that is positive in each cycle, thus, the average value of the output of this component $c_1$ is a whole number. In contradistinction by observing lines c, d and e, it is seen that capacitor $c_1$ charges to an average positive value during its first cycle and to an average negative value of equal magnitude in a second cycle so that $c_0$ averaged over two periods (line "e") provides a zero value. Although it is harder to show this zero average value diagrammatically for frequencies other than 1.5 $f_0$, the charge on the capacitors will nevertheless average out to zero over some period of time. Attenuation and phase shift of noise, at frequency $F_0 \pm \Delta F$ increases with $\Delta F$. The maximum phase shift in one filter section is $\pm 90°$.

The above described property of commutative filters provides a frequency sensitivity that is dependent upon the crystal controlled switching frequency $f_0$ and that is independent of component tolerances or changes thereof due to temperature. In addition, the commutative filter gives control over the filter selectivity (bandwidth) and the filter roll off rate. These controls are independent of each other, independent of the center frequency, and independent of the component changes due to temperature. The filter selectivity is a function of (a) the multiplicity of the capacitors, (b) the value of resistor 71 and (c) the value of the capacitors 74. The roll off rate is a function of the number of filter sections used, with the rate equal to minus 20 decibels per decade per filter section.

The bandwidth of the filter by convention is specified as the 3 db point. The $\Delta F$ of the 3 db point is $1/2\pi NRC$. From this it is seen that the bandwidth of the filter response is dependent upon the RC time constant of the filter of FIG. 3, but that the center frequency ($f_0$) is a function of the high stability of the crystal controlled oscillator as opposed to the lesser stability of the capacitors and resistors in response to temperature changes.

Referring now to FIG. 5 of the drawings, an AGC (automatic gain control) circuit is shown having a series resistor 86 in series with the signal path and FET 87 that shunts the signal path. The resistance of the FET can be controlled, thereby controlling the amount of attenuation of the signal. Following that are two stages of amplification 88 and 89 which establish the maximum gain of the AGC.

The amplifier stages are non-inverting gain configurations which include gain determining impedances that are a function of frequency. For example amplifier stage 88 has a $Z_1$ impedance network 85 between its output and its inverting input. An additional $Z_2$ impedance network 90 is placed in the circuit between the inverting input and ground. The same impedance networks are provided for amplifier 89. In the operation of the AGC circuit, the gain of the amplifiers 88 and 89 is determined by the frequency response of the impedances of networks 85 and 90. The gain equation for the amplifiers 88 and 89 is $A = 1 + (Z_1/Z_2)$. If you allow the impedance of $Z_1$ to decrease as the frequency increases and allow $Z_2$ to increase as frequency decreases, then the overall gain response is analogous to a broad band filter. The bandwidth of the filter is established by the 3 db roll off point of the impedances $Z_1$ and $Z_2$. With the use of such gain determining impedance networks, gain is not applied over the entire frequency spectrum received, but rather only to a relatively narrow band of frequencies including any of the precise frequencies ($f_0$) to be used by the system.

Included in the feedback loop of the AGC circuit are the commutative filters 46 and the absolute value circuit 54. The wave form emerging from the filters is in the shape of the eye as shown in FIG. 5. This wave form passes through the absolute value circuit 54 with all of the negative portion of the signals inverted. The inverter 91, which follows the absolute value circuit, inverts the remaining signal to give it the correct level for application to the field effect transister 87 which requires a negative voltage to turn it off.

An AGC integrator 92 in the feedback loop has a very long time constant in the order of about 10 seconds. The purpose for this is that the signals coming into the integrator occur every time a data bit is in the bit stream. If it were not for the long time constant, every time a data bit occurred the feedback loop would output and would change the gain of the AGC appreciably. It is preferable to present a normalized signal to the commutative filters, the gain of which is not changing as the result of every bit of data that comes in. Therefore, by having a long time constant, it takes several data bits into the AGC integrator before the DC output level of that integrator changes. Additionally, if the time constant on the AGC integrator were small a noise burst would also have more of an affect upon the gain of the AGC. However, since the feedback loop to the AGC circuit comes after all of the filtering, most of the noise outside of the band that we are looking for is rejected. Noise that does come within the band will affect the gain of the AGC. That amount of noise is small compared to the total noise available in the entire spectrum.

The above described system of filtering the AGC control loop signal allows the system to lock onto the strongest signal passing through the AGC. One advantage that such a system affords is a less likelihood of inadvertent lock-on of the system to noise occurring at the precise frequency being utilized to transmit data. This in turn facilitates the use of a single frequency within the system, with repeaters receiving and sending at the same frequency. For example, if the AGC were not controlled by a filtered controller and was rather controlled by its own output, noise within the system would control the AGC, since noise in the present environment is generally greater than the signal. Thus, the AGC would establish a certain output level as defined by how much noise arrived at its input. Buried in such noise, you could have a signal from the closest repeater station and another signal from a repeater station spaced further away with the latter being a weaker signal. The system could still lock onto the weaker signal and would stay locked onto it because there would be no controlling means to pull it away from such weaker signal, since the AGC gain would be controlled by noise.

On the other hand, where as in the present system, filtering takes place within the control loop of the AGC, the AGC gain is controlled by signal. Assume then that the system locks onto the weaker signal as in the example above. The time delay between the two signals arriving at the AGC from close and further away repeaters is fairly small, for example, on the order of 100 milliseconds. If the system locks onto the weaker signal, the stronger signal will appear approximately one-tenth of a second later. Since the AGC integrator has a long time constant or window encompassing the one-tenth second time span, the window will see the stronger signal and, as a result, shift its locking point from the weaker signal to the stronger signal, thus the control for the AGC will be a function of the stronger signal. As seen from the above example, a result of this AGC capability is a greater capability to use a single frequency system as opposed to the multiple frequency system generally described throughout this specification.

The output of the AGC integrator is a DC level and that DC level changes with the accumulation of incoming data pulses. Because the integrator is operated essentially open loop, it will compensate for any parametric changes in the FET 87 or in any of the other components throughout the entire loop. For instance, if the threshold voltage of the FET 87 were to change, that is, the threshold voltage for example lowered as a result of temperature changes, then the device would momentarily go into a heavier conduction so it would attenuate the incoming signal more. Such attenuation of the signal would in turn feed back to the AGC integrator and thereby cause the output voltage of the AGC integrator to lower by the same amount that the threshold of the FET device changed. This would bring the FET 87 back to its normal level that existed before the temperature change occurred. By having the AGC within a closed loop such as this, any parametric changes due to temperature or time or deterioration of a device are compensated by the closed loop.

Figure 6:
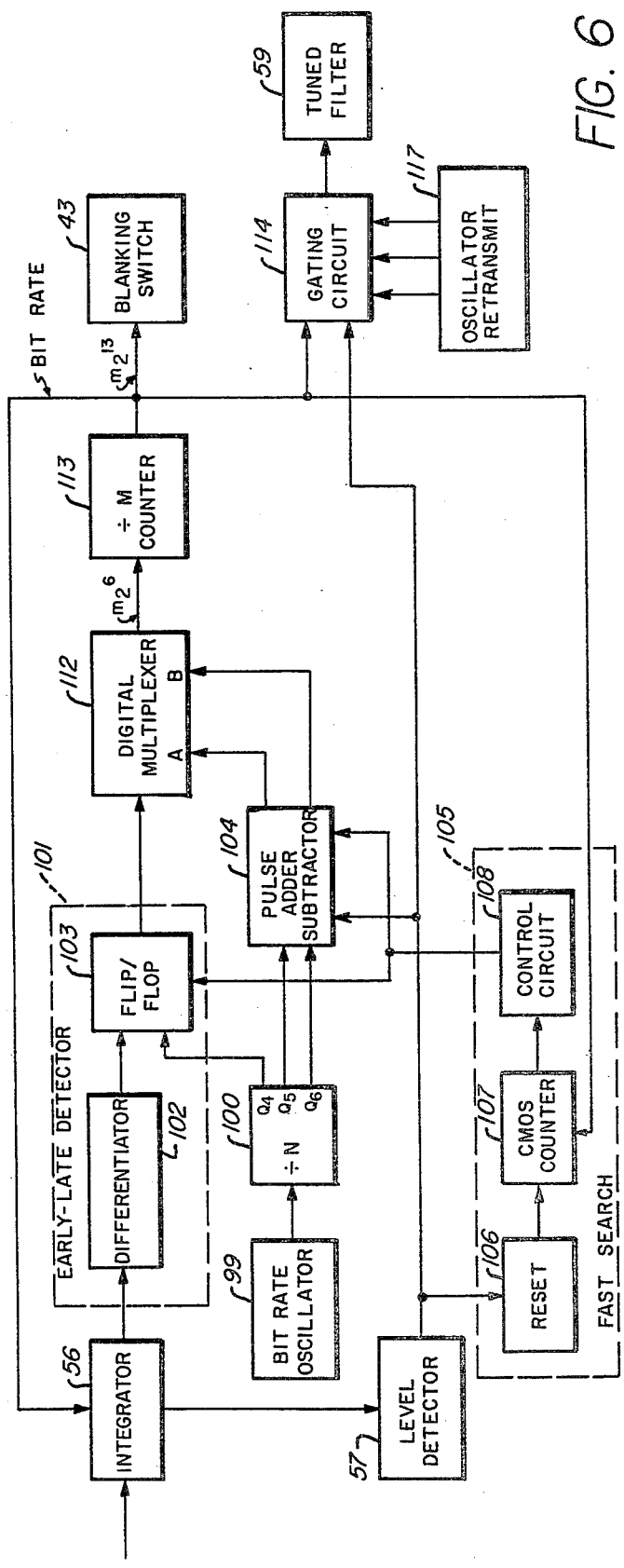
FIG. 6 is a more detailed schematic diagram of the bit rate clock circuit of FIG. 2.

Referring next to FIG. 6 of the drawings, the digital implementation of a clock, referred to in FIG. 2 as Bit Rate Clock 58, consists of essentially four different functions which were mentioned earlier. These are an early-late detector, a fast search mode, the bit rate clock itself and an oscillator retransmit section. The data stream that iss passed by the integrator 56 goes to early-late detector 101 which is comprised of a differentiator 102 and flip flop 103. The early-late detector compares the data bit to a clock signal and then provides a signal from the output of the flip flop 103 to a digital multiplexer 112. Other A and B inputs to the digital multiplexer 112 are passed from a pulse adder-subtractor 104 which is digitally phase shifting the output of a crystal oscillator 99 and divide by "N" counter 100. The crystal oscillator 99, divide by "N" 100, pulse adder-substractor 104, digital multiplexer 112, and a divide by "M" counter 113 provide the clock function of the bit rate clock 58 to output a bit rate. The crystal oscillator 99 operates at substantially the same frequency as the transmitter clock that generates the incoming data stream to the circuit. Because the tolerance on the crystal oscillator 99 is stable over temperature variations, these two crystal oscillators will operate at very close frequencies and will stay in such close operation for a long period of time. Therefore, the synchronization function of the bit rate clock is only to make small corrections that maintain the two clocks in full synchronization at all times. Control circuitry as will be hereinafter described for maintaining these small corrections need only shift the bit rate clock very small amounts. Therefore, the chances of the clock being shifted completely out of synchronization is unlikely. The early-late detector 101 compares the two inputs, that is, the bit rate within the local crystal oscillator 99 and divide by "N" 100 and the received data stream. The early-late detector then determines whether or not the received data stream comes within the window that the local bit rate clock is looking for. If the window is opened too early, then a correction will be made such that the window will be opened up a little bit later for the next incoming data stream. The window in this situation is the integrator 56 which receives its control signal from the bit rate clock 58. Essentially, the bit rate clock knows when a received data bit should be coming in so it opens up the window in the integrator at the time that it is supposed to be receiving a data bit. If a data bit is received during that window time, it would have passed through all the filtering, and integrator, and would be an output of the integrator itself. The same data stream output that passes from the integrator to the differentiator 102 also is detected by the level detector 57 when it goes high as a result of a signal output or data "one" for passage to the pulse adder-subtractor and to a reset circuit 106 in a fast search circuit 105. The other signal from the integrator which passes directly to the differentiator 102 in the form of a data bit is looked at by the early-late detector. The differentiator 102 differentiates the signal and passes it to a flip flop 103. The flip flop 103 compares the signal with the output of the crystal oscillator and divide by "N" counter to determine if the output of the integrator is early or late with respect to the output of the bit rate clock. If the pulse is early, this means that the integrator window was opened too late so a feedback signal from the bit rate clock to the integrator opens the window of the integrator earlier for reception of the next data bit.

This shifting of the window in the integrator is accomplished by adding and subtracting a pulse to the bit rate oscillator input to adder substractor 104 and then by means of the early-late detector, selecting one of these modified signals to serve as the bit rate. The digital multiplexer 112 receives an A and B input from adder-subtractor 104, one of which is the bit rate oscillator with one pulse added and the other of which is the bit rate oscillator with one pulse subtracted. The addition or subtraction of that one pulse will shift the phase of the clock less than one percent, or in other words, a very small correction. This adding and subtracting of a pulse to the bit rate oscillator is accomplished every time a data "one" is received because this comparison is continuously made to see if the received data bit is early or late. The input to the adder-subtractor 104 from level detector 57 tells the adder-subtractor when a data "one" is received. The digital multiplexer will always shift the bit rate clock one pulse in one direction or the other; that is, it will always add or subtract a pulse.

The bit rate oscillator 99 output is multiplied in the divide by "N" 100 counter circuitry to provide two outputs to pulse adder-subtractor. The $Q_5$ output of divide by "N" 100 is a timing clock to operate the adder-subtractor. $Q_6$ output is a divided down bit rate oscillator to which pulses are added and subtracted for passage to the A and B inputs of digital multiplexer 112. The level detector 57 signal to the pulse adder-subtractor is a signal that tells that adder-subtractor to add or subtract. i.e., that a data bit or "one" is being received.

In this respect, if a pulse is added and the addition of that pulse pulls the bit rate clock the wrong way or slightly out of synchronization, then the next time the circuit will subtract from that signal and correct it. This of course would be true with any noise that comes in. If noise activates the bit rate clock, by the very nature of noise, the average value of the shifting early and late should always be zero. Although there is a continuous jittering affect going on due to this add and subtract network, the overall effect is that the bit rate clock is fully synchronized with the clock that is controlling the transmission of the incoming data stream.

Another section of the bit rate clock circuit is that of the fast search mode 105. The fast search mode finds particular application when the system is first powered up. At that time it is possible that the crystal oscillator 99 and the oscillator clock of the incoming data transmission would be completely out of synchronization and therefore incapable of providing useful data. As a result, because the bit rate clock makes such small corrections each time from the control of the early-late detector and the pulse adder-subtractor, a large desynchronization of the clocks would prevent the bit rate clock from ever seeing data. This is because the window of the integrator would be opened entirely at the wrong time. In that event, the early-late detector would be essentially controlled by noise and it would continue to jitter back and forth with no net shift in synchronization. The possibility would exist in that case that the two clocks would never synchronize or that it would take a very long time before the two clocks would be synchronized if they started out completely out of synchronization.

The fast search mode, therefore, looks at the bit rate being generated by the bit rate clock by means of a feedback loop from the divide by "M" counter 113 to a CMOS counter 107 in the fast-search circuitry. The counter 107 determines whether data is received during a predetermined number of bit times and if no data is received during that period of time, it will cause the bit rate clock to shift continuously in one direction instead of allowing the noise to take over and shift the bit rate clock back and forth. When the counter 107 does not see a data bit for the predetermined period of time, it passes a signal to a gate control circuit 108 which in turn controls the early-late detector and pulse adder-subtractor portion of the bit rate clock to run in a single direction until the output of the bit rate clock passing back to the integrator 56 catches up with the incoming data stream to provide a synchronous window. At that time, the fast search mode drops out of operation, and the early-late function takes over again. The drop out of the fast search mode is accomplished by passing a data signal from the level detector 57 to a reset circuit 106 in the fast search circuitry. When the integrator passes a data signal through the level detector to the reset 106, the fast search mode recognizes the data signal and thereby recognizes that the bit rate clock has caught up and is getting data at the time that the integrator window is opened. At this time the fast search mode ceases functioning to let the early-late circuitry continue its controlling operation.

The fast search circuitry has two inputs, the input of the received data stream from the level detector 57 and the input from the bit rate clock itself. CMOS binary counter 107 within the fast search circuitry counts X number of bit times. Every time the bit rate clock says that there should be a data bit at this time, the counter 107 will clock that. If it has not received any valid data for X number of counts, control circuit 108 passes a signal to flip flop 103 to cause the early-late circuitry logic to think that the received data is early. The output of the control circuit sets the flip flop in that one state regardless of what the data input coming into the flip flop is. It thereby forces the flip flop into the one state to continuously tell the digital multiplexer that the data bit is early. Control circuit 108 also passes a data stream signal to the pulse adder-subtractor in place of the data "ones" which would normally be incoming from level detector 57 to provide a signal to the adder-subtractor that acts as a false data "one" for continuously operating the adder-subtractor in the fast search mode.

Referring again to the early-late detector, differentiator 102 is looking at the output of integrator 56, which is an integrated signal that rises with an RC time constant. The signal then rounds off and tends to flatten out when there is no more rising signal available to it. This rounding off and flattening out occurs prior to the reset of the integrator with the output of the integrator going to zero at the integrator reset time. The differentiator is essentially looking at this inflection point in the signal. When the integrator output starts to round off and flatten out, that inflection point is what the differentiator is looking for. The output of the differentiator triggers at that point. Flip flop 103 which generates the logic that tells the circuit whether the signal is early or late, looks for that transition output of the differentiator and compares it to a known time instant (representing the center of the time window) which it receives from the divide by "N" counter 100. The incoming signal from the integrator should be at its maximum level in the middle of the time window. When that maximum level coincides with the inflection point in the integrator output, then the two signals are in synchronization. Thus the flip flop compares the output of the differentiator with the clocking signal coming to it from the divide by "N" 100 to determine whether the divide by "N" signal is in the middle of the window or whether it is on one side of the window or the other. Logic level that is outputted from the flip flop 103 corresponds to whether the signal was input early or late to control the digital multiplexer 112 respectively. The digital multiplexer 112 then selects an A or B input from the pulse adder-subtractor 104. The A input from pulse adder-subtractor 104 has clock transitions added to it whereas the B input from adder-subtractor 104 has a clock transition subtracted from it. If the signal is early then the digital multiplexer will select which ever input it needs in order to provide a subtracted pulse on its output. If the signal however, is late the multiplexer will select the other input so that it is continuously selecting either A or B inputs from the adder-subtractor. Therefore, the multiplexer is selecting the bit rate oscillator that has either had a clock bit added to it or a clock bit subtracted from it. The output of level detector 57 passes to the adder-subtractor 104 in order that the bit may be added or subtracted from the pulse stream and then passed to the digital multiplexer. Thus one or the other of the A or B streams is selected for passage onto the circuit as the bit rate clock.

The output of the digital multiplexer 112 is a modified clock because its output has had pulses either added or subtracted to it. This output is passed to the divide by "M" counter 113 which simply divides the clock frequency down to the bit rate clock. Since the input to the divide by "M" counter is a modified clock, it is essentially just a synchronized clock. The divider chain does not loose any of the synchronization but merely divides down to the operational bit rate, which is a frequency lower than the frequency of the modified clock.

The output signal of the bit rate clock is passed to a retransmitting circuit and at the same time to the blanking switch 43. Therefore as the circuit retransmits this signal at a different frequency, the blanking switch serves to blank off the remaining circuitry behind it so that the circuitry is not saturated by the high voltage transmitted signal to the drill string. The output of the bit rate clock is also passed to gating circuit 114 which allows the transmission of a given frequency from the high frequency oscillator 117 for a specified length of time and only during those times that the bit rate clock says that a "one" should be retransmitted. This is accomplished by providing an output from the level detector 57 to the gating circuit 114 to control passage of an output to tuned filter 59 only when data "ones" are received.

While particular embodiments of the present invention have been shown and described, it is apparent that changes and modifications may be made without departing from this invention. For example, the system has been disclosed for the most part as providing a data signal transmission from downhole to the surface. It is readily seen that sending signals from the surface downhole would be useful. An additional example of such a change or modification would reside in using the system to transmit and retransmit at a single frequency. While for the most part the system is described as using a mix of frequencies to provide directional isolation, it is possible to utilize a single frequency with or without repeaters. In any event, it is the aim of the appended claims to cover all such changes and modifications as fall within the true spirit and scope of this invention.

We claim:

1. In a borehole telemetry system for passing signals in the form of a data signal over an elongated column acting as an acoustic path in the borehole, said acoustic signals having a data component embedded in a high noise background, circuit means for providing a clock synchronization system to operate data signal processing circuitry, which means comprises:
    transmitter means for retransmitting a received data signal;
    clock means for supplying a clock signal to the transmitter means in close synchronization with a clock used in the transmission of the received data signal;
    comparator means for determining whether the received data signal occurs before or after the clock signal;
    means for shifting the clock signal a small amount in response to the determination of the comparator means; and a separate means for enabling a more rapid shifting of the clock than provided by said first means for shifting signal.

2. The apparatus of claim 1 wherein said enabling means is operated in response to control means for detecting the absence of a data signal during a predetermined time period.

3. The apparatus of claim 2 wherein said control means includes a counter for counting the predetermined time period, means for determining the absence of a data signal and means operable in response to the absence of a data signal for the predetermined time period to enable a rapid shifting of the clock signal.

4. The apparatus of claim 1 wherein said means for shifting the clock signal includes means for adding and subtracting a pulse from the clock signal.

5. The apparatus of claim 4 and further including means for selecting a modified clock signal that has either had a pulse added to it or a pulse subtracted from it.

6. The apparatus of claim 5 wherein said selecting means is a digital multiplexer.

7. The apparatus of claim 5 wherein said selecting means is operated to select one of said modified clock signals in response to a signal from said comparator means.

8. The apparatus of claim 1 and further including blanking means for cutting off a portion of the data signal processing circuitry from receiving a signal when said transmitter means is being operated.

9. The apparatus of claim 1 and further including means for generating a plurality of signals, each being at a different frequency and gate means for passing one of said generated signals to said transmitter means when a data signal is received by the clock synchronization system.

10. The apparatus of claim 2 and further including reset means operable in response to the reception of a data signal in the data signal processing circuitry for discontinuing the function of the enabling means.

11. In a borehole telemetry system for passing transmitted acoustic signals in the form of a data stream over an elongated column acting as an acoustic signal having a data component embedded in a high noise background, circuit means for synchronizing the operation of a system component with the transmitted signal, which means comprises:
    means for receiving an incoming transmitted data signal;
    clock means for supplying a clock signal to system components, said clock means being operated at substantially the same precise frequency as a clock used in transmitting the incoming data signal;
    comparator means for comparing the timing of the incoming transmitted data signal and the system component clock signal;
    means for shifting the clock signal a small amount in response to compared timing of the comparator means to synchronize the operation of a system component with the incoming transmitted data signal; and a separate means for enabling said shifting means to more rapidly shift the clock signal than by said first means for shifting.

12. The apparatus of claim 11 wherein said enabling means is operated in response to control means for detecting the absence of a transmitted data signal into the system component during a predetermined time period.

13. In a borehole telemetry system for passing acoustic signals in the form of a data signal over an elongated column acting as an acoustic path in the borehole, said acoustic signals having a data component embedded in a high noise background, circuit means for providing a clock synchronization system to operate data signal processing circuitry, which means comprises:
- transmitter means for retransmitting a received data signal;
- clock means for supplying a clock signal to the transmitter means in close synchronization with a clock used in the transmission of the received data signal;
- comparator means for determining whether the received data signal occurs before or after the clock signal;
- means for shifting the clock signal a small amount in response to the determination of the comparator means; and
- means for enabling a rapid shifting of the clock signal, said enabling means being operated in response to control means for detecting the absence of a data signal during predetermined time period.

14. The apparatus of claim 13 wherein said control means includes a counter for counting the predetermined time period, means for determining the absence of a data signal and means operable in response to the absence of a data signal for the predetermined time period to enable a rapid shifting of the clock signal.

15. The apparatus of claim 13 and further including reset means operable in response to the reception of a data signal in the data signal processing circuitry for discontinuing the function of the enabling means.

16. In a borehole telemetry system for passing acoustic signals in the form of a data signal over an elongated column acting as an acoustic path in the borehole, said acoustic signals having a data component embedded in a high noise background, circuit means for providing a clock synchronization system to operate data signal processing circuitry, which means comprises:
- transmitter means for retransmitting a received data signal;
- clock means for supplying a clock signal to the transmitter means in close synchronization with a clock used in the transmission of the received data signal;
- comparator means for determining whether the received data signal occurs before or after the clock signal;
- means for shifting the clock signal a small amount in response to the determination of the comparator means; and
- means for generating a plurality of signals, each being at a different frequency and gate means for passing one of said generated signals to said transmitter means when a data signal is received by the clock synchronization system.

* * * * *